United States Patent [19]
Hurt

[11] Patent Number: 5,493,983
[45] Date of Patent: Feb. 27, 1996

[54] BOAT FENDER HANGER

[76] Inventor: Norbert M. Hurt, 34 Mockingbird La., Earleville, Md. 21919

[21] Appl. No.: 458,363

[22] Filed: Jun. 2, 1995

[51] Int. Cl.⁶ .................................................. B63B 59/02
[52] U.S. Cl. ........................................ 114/364; 114/219
[58] Field of Search .................................. 114/219, 218, 114/364, 221 R; 248/58, 61, 62, 63, 65, 74.1, 493; 24/129 R, 129 B, 129 A, 130

[56] References Cited

U.S. PATENT DOCUMENTS

| | | | |
|---|---|---|---|
| D. 248,367 | 7/1978 | Haft | D8/356 |
| 3,146,754 | 9/1964 | Ohnsman | 114/199 |
| 3,575,371 | 4/1965 | Carlstedt | 24/129 |
| 4,280,435 | 7/1981 | Loomis | 114/219 |
| 4,738,214 | 4/1988 | Fry | 114/218 |
| 4,895,094 | 1/1990 | Carlstedt | 114/218 |
| 4,998,495 | 3/1991 | Bos et al. | 114/218 |
| 5,207,171 | 5/1993 | Westwood, III | 114/218 |
| 5,327,847 | 7/1994 | Cook | 114/218 |

FOREIGN PATENT DOCUMENTS

| | | | |
|---|---|---|---|
| 2649376 | 1/1991 | France | 114/364 |

OTHER PUBLICATIONS

1995 Boat/U.S. Annual Equipment Catalog, Boat Owners Assocation of the United States, p. 113.

*Primary Examiner*—Jesus D. Sotelo
*Attorney, Agent, or Firm*—Jeffrey C. Lew

[57] ABSTRACT

A hanger for suspending a boat fender alongside the hull of a boat to prevent damage from collision with another boat, a dock or other object near which the protected boat is to be tied or berthed. The boat fender hanger is hung from a suspension cable on the protected boat, such as a guard rail or lifeline, and a suspension line attached to the fender is secured to the hanger. The hanger can be transported easily from one position to another on the cable and it has an anti-detachment feature which reduces the risk of accidentally losing the hanger and fender overboard. The hanger provides the ability to move the hanger from place to place on the suspension cable and to adjust the vertical elevation of the fender using only one hand. The novel hanger has an elongated body separated from a back plate by a channel which receives the suspension cable for hanging the hanger. In operation, the free end of the fender suspension line is threaded through a bail at a foot of the body, along an outboard face of the body and through a fairlead. The free end is fastened to the hanger with line attachment means such as a cam cleat. The boat fender hanger can be used for hanging and positioning objects other than boat fenders to be suspended from a generally horizontal rod-like structure.

20 Claims, 4 Drawing Sheets

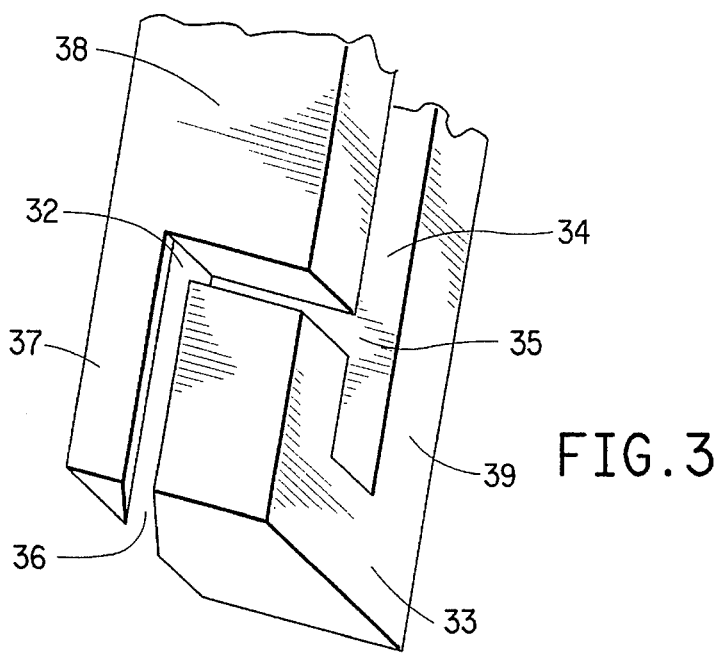
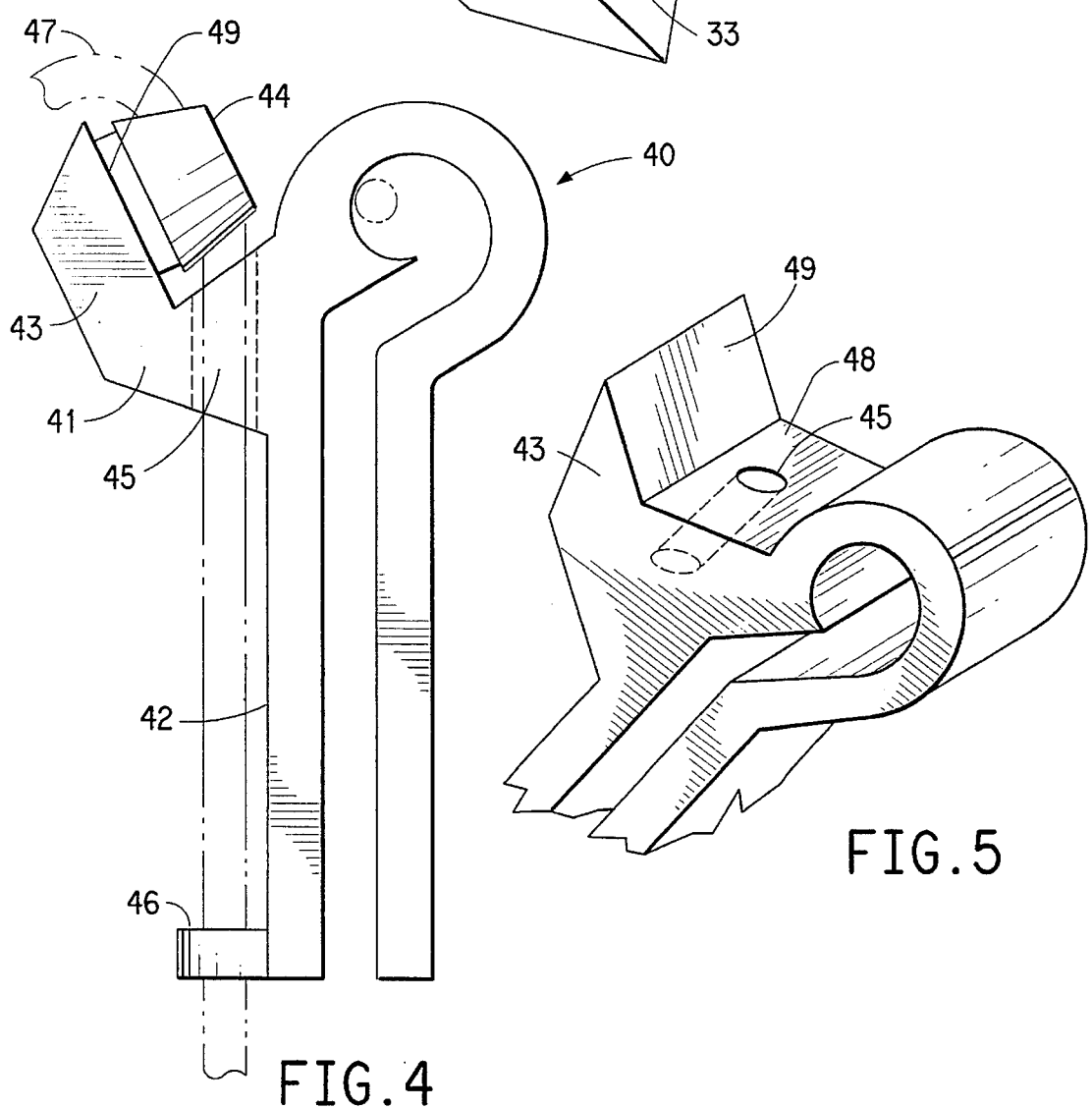

5,493,983

BOAT FENDER HANGER

FIELD OF THE INVENTION

This invention relates to an apparatus for positioning an object suspended from a line. More specifically, it relates to an adjustable hanger for holding a fender alongside a boat.

BACKGROUND AND SUMMARY OF THE INVENTION

When a boat is tied up against another object, such as a piling, a dock or another boat, a boat fender is frequently deployed to prevent damage to the hull of the boat the object or both. The boat fender is usually suspended alongside the hull by at least one rope, (hereinafter, "line"). One end of the line is attached to the fender and the other, free end is fastened to the protected boat in a manner that places the fender between the boat and object to be kept away.

Traditionally, deck cleats and rings have been used to hang boat fenders. These are usually mounted at fixed positions along the gunnel of the boat. The disadvantages of such fixed position fasteners are well recognized. For example, often they are not positioned horizontally, i.e., fore-to-aft, to effectively place the fender at the location needing protection. They also are usually at deck level, which requires the deckhand to stoop awkwardly to secure the line.

Recently, portable fender hanging fasteners have been developed. Such devices generally hang from lifelines or guard rafts commonly found on modern marine vessels, especially recreational craft. One representative commercial fastener of this type, called a "Fender Bender" includes a wire helix member for hanging a V-hook from a lifeline. The fender line is then fastened to the V-hook with a hitch knot. Two hands normally are necessary to adjust the knot to change the level of a fender. The helix member intertwines with the lifeline, which makes horizontal repositioning of a fender cumbersome and time-consuming. To move the Fender Bender past stanchions that are typically placed several feet apart along lifelines, the helix member must be extricated from the lifeline and intertwined at the desired new location.

Fender hangers known in the art suffer the drawback of the need to use two hands to adjust the position of a fender. For example, the anchor for suspending a boat fender disclosed in U.S. Pat. No. 4,280,435 includes a hanger with several apertures. The fender line threads through the apertures in a path designed to jam the line on itself. The jammed line holds the fender at a desired elevation. However, adjusting the fender elevation requires two hands.

U.S. Pat. Des. No. 248,367 discloses a hanger for a boat fender which employs a strap with a closure button that prevents the hanger from accidentally falling off a lifeline or guard raft. Additionally, the hanger jams a hurled wheel against the fender line to fasten the line. In order to lower a fender, one hand is needed to lift the wheel away from the line, while a second hand tends the line.

Boat fenders are often deployed when the vessel is in motion approaching a dock or another boat. At such a time the deckhand needs to step lively to accomplish critical tasks in addition to deploying a single fender. For example, while simultaneously deploying one fender, the deckhand might need to tend a second fender, to tend a boathook, to haul in a dockline or to adjust a spring line. Frequently in recreational boating, the deckhand is an inexperienced guest. While attempting to obey the skipper's hurriedly issued commands when docking, such a neophyte deckhand can become so stressed that assigned duties, including deploying fenders properly, cannot be accomplished. Thus, it is an object of the present invention to provide a boat fender hanger with which even an unskilled sailor can easily deploy a fender, thereby allowing the deckhand to attend to the skipper's orders and to perform multiple tasks simultaneously.

It is another object of this invention to provide a boat fender hanger that permits vertical fender position adjustment without the need to use two hands.

Still another object of the present invention is to provide a boat fender hanger that can be deployed and redeployed at different places on lifelines and guard rails without the need to use two hands.

Accordingly, there is now provided an adjustable hanger to be hung from a suspension cable having a cross section dimension, the hanger comprising:

- an elongated body having an outboard face, an inboard face, a head and a foot;
- a bail on the outboard face of the foot, the bail defining an opening for passage of a line from an object to be suspended from the hanger;
- a ledge extending from the outboard face of the head at an acute angle with a plane coincident with the outboard face;
- a fairlead on the head to allow free vertical movement and restricted horizontal movement of the line;
- a back plate extending along a portion of the inboard face and spaced apart therefrom to define a channel having an open end proximate to the foot and adapted to receive the suspension cable;
- a bridge joining the elongated body and back plate, the bridge defining a closed end to the channel in a serpentine cross section adapted to pivotally support the hanger on the suspension cable; and
- a line attachment means on the ledge, bridge or back plate for releasably fastening the line to the hanger.

BRIEF DESCRIPTION OF THE DRAWINGS

FIG. 3 is a partial perspective view of the foot of a preferred fender hanger having a winding path channel.

FIG. 4 is a side elevation view of a different embodiment of the boat fender hanger of this invention.

FIG. 5 is a partial perspective view of the head of the fender hanger shown in FIG. 4 without a cam cleat.

DETAILED DESCRIPTION

Figure 1:
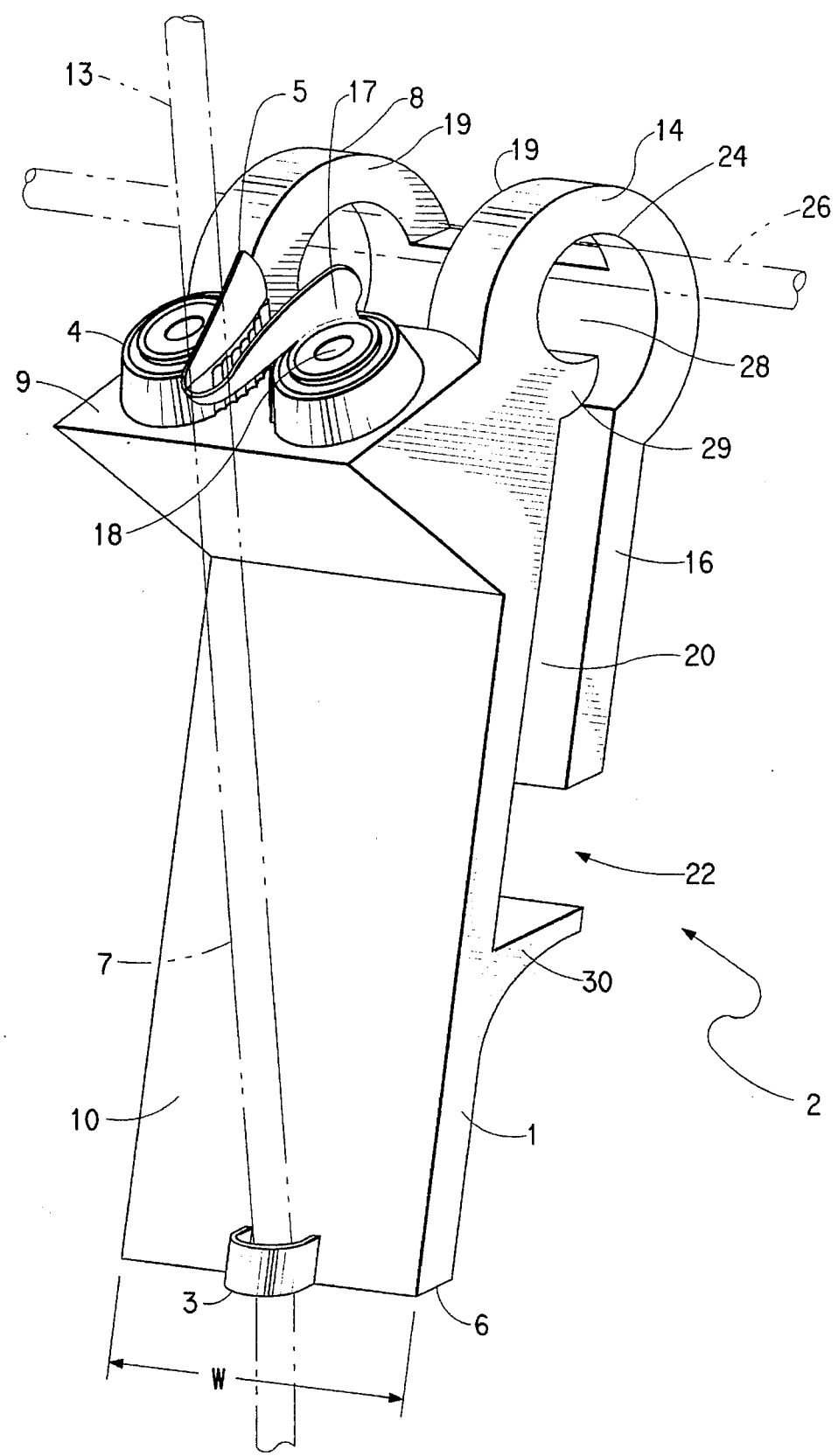
FIG. 1 is a perspective view of a boat fender hanger according to the present invention.

FIG. 1 illustrates a preferred boat fender hanger 2 which is intended to be mounted on a guard rail, lifeline or similarly rod-shaped, suspension cable. The hanger comprises an elongated body 1 having a foot 6 and a head 8. The body has a generally broad outboard face 10, i.e., a face which fronts toward the side of the boat along which the fender is deployed. The hanger further includes a generally broad back plate 16 behind the body and attached at the head thereto by a bridge 14. The back plate and body inboard face 12, FIG. 2, are separated by a channel 20 having an open end 22 near the foot which terminates in a closed end 24 at the bridge.

The channel generally extends completely through the width of the hanger, w, to receive the suspension cable 26, shown in phantom. The hanger is mounted by introducing the suspension cable into the open end, and moving the hanger in a direction parallel to axis of elongation, X, FIG. 2, to advance the cable toward the closed end. The closed end of channel has a serpentine cross section 28 perpendicular to the axis of the cable. The serpentine cross section is defined by the bridge and a hip 29, protruding from the inboard face 12. The hanger suspends from, and pivots freely about the cable. The hip prevents the cable from sliding out of the channel during fender position adjustment, as will be described, below. In the direction parallel to the axis of the cable, the channel is generally straight. This permits the hanger to slip smoothly onto the cable and to slide freely along the cable for horizontal fender position adjustment.

In simplest form, the channel is straight between open and closed ends. This permits the hanger to be mounted easily by slipping the cable into the channel and lowering the hanger until the cable stops at the closed end. The channel preferably has a winding path configuration to resist unexpected detachment from the cable. The hanger thus can be stored on the suspension cable without a fender attached. The channel bends will stop the hanger from falling off, thereby reducing the risk that the hanger will be lost overboard accidentally. In the embodiment shown in FIGS. 1 and 2, the channel 20 has a winding path in an L-shape defined in part by an inboard extending arm 30 protruding from the inboard face near the foot. FIG. 3 shows in perspective a different winding path 32 incorporating a T-shape configuration 34 formed by elongated body 39, arm 33 and back plate 38. This embodiment further includes a back plate extension 37 which defines a skewed channel 36. The skewed channel provides further security against accidental hanger detachment. It requires that the cable be aligned with the junction of the T-shape 35 and that the hanger be twisted radially with respect to its axis of elongation in order to remove the hanger from the cable. Hangers with either direct or winding path channels can be mounted on and removed from a cross suspension cable using only one hand.

Figure 2:
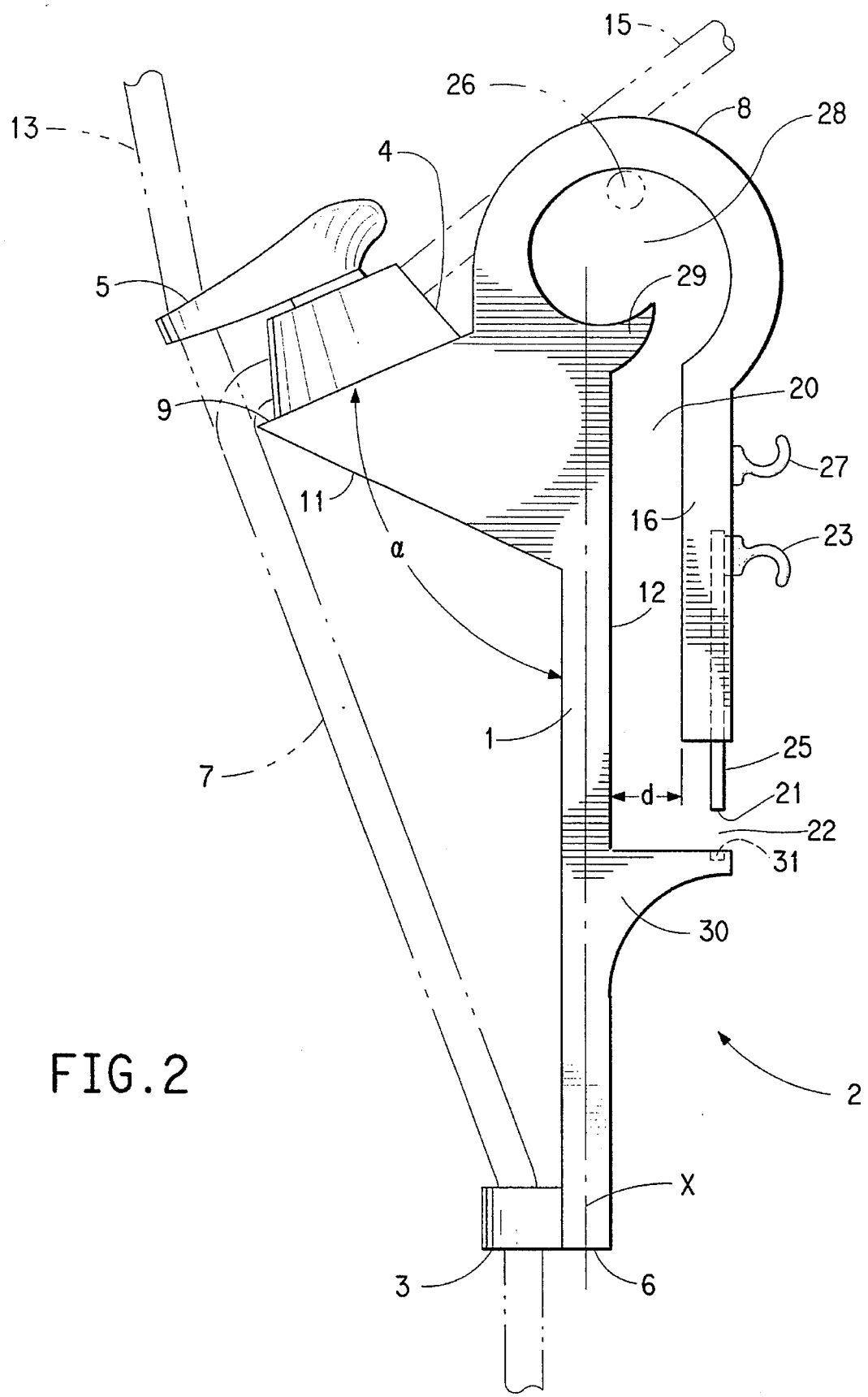
FIG. 2 is a side elevation view of the fender hanger shown in FIG. 1.

An optional mechanical locking means, such as a spring-loaded sliding lock 25, FIG. 2, on the back plate can substitute for, or augment, the winding path anti-detachment feature. Such a locking means blocks the open end of the channel, thereby preventing the hanger from falling off the cable. The sliding lock illustrated is operable with one hand by gripping stationary stop 27 with the thumb while pulling trigger 23 with the forefinger. Normally a spring, not shown, forces the tip 21 of the sliding lock against arm 30 to block the open end of the channel. Drawing the slide against action of the spring removes the block from the open end. To provide a stronger lock, the arm can have a cavity 31 to receive the tip. After the hanger has been hung on the cable, releasing the trigger returns the sliding lock to the channel blocking position, i.e., extends tip 21 into cavity 31. The stop and trigger further provide a convenient handle for holding the hanger. At least one of the stop and trigger can be a ring having a finger hole rather than a lever-style grip, as illustrated in FIG. 2.

Figure 6:
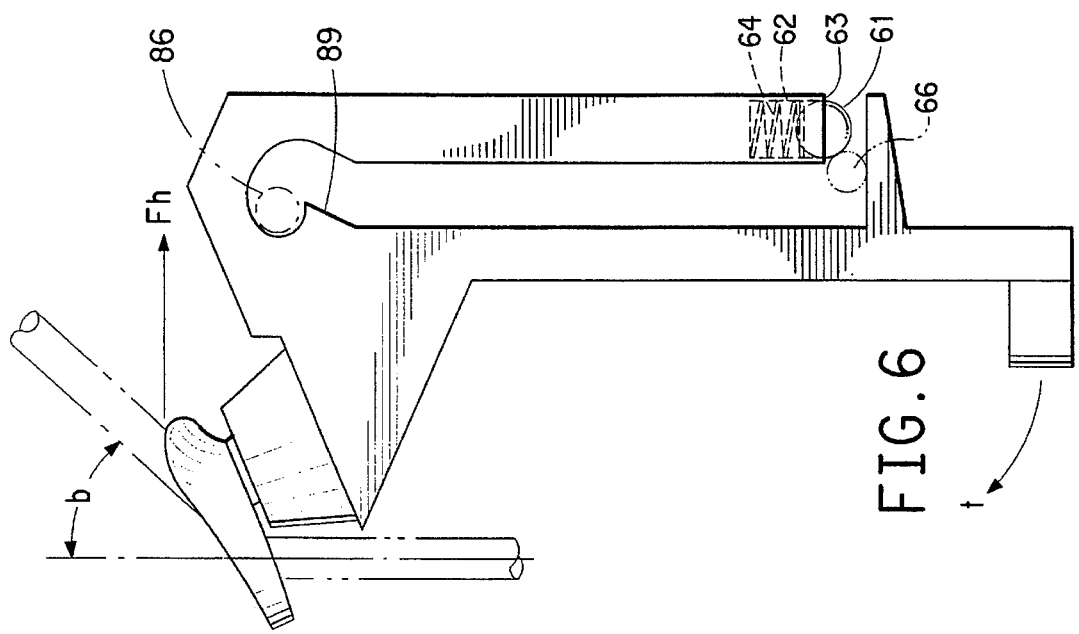
FIG. 6 is a side elevation view of another embodiment of the novel fender hanger.

The mechanical locking means also can be a channel depth restriction. Referring to FIG. 6, a channel depth restriction too narrow for the cable to pass can be created, for example, with a spring-loaded cam device in the back plate. The cam is a sphere 61 residing in a cylindrical cavity 62 coaxial with the longitudinal axis of the back plate. A plate 63 covers the entrance to the cavity. The plate has a hole of diameter slightly smaller than the diameter of the sphere, which keeps the sphere in the cavity. A compressed spring 64 forces the sphere to protrude into the channel. The sphere and hole diameters can be selected to push the sphere into the channel to a depth that the cable 66 cannot pass. By pushing the cable against the sphere with sufficient manual force to counter the force of the spring, the sphere is caused to retract into the cavity to allow the cable to pass. Equivalent cam devices wherein the cam is located in the body or in both body and back plate; or wherein the cam is more than one individually spring-loaded sphere are also envisioned.

Figure 7:
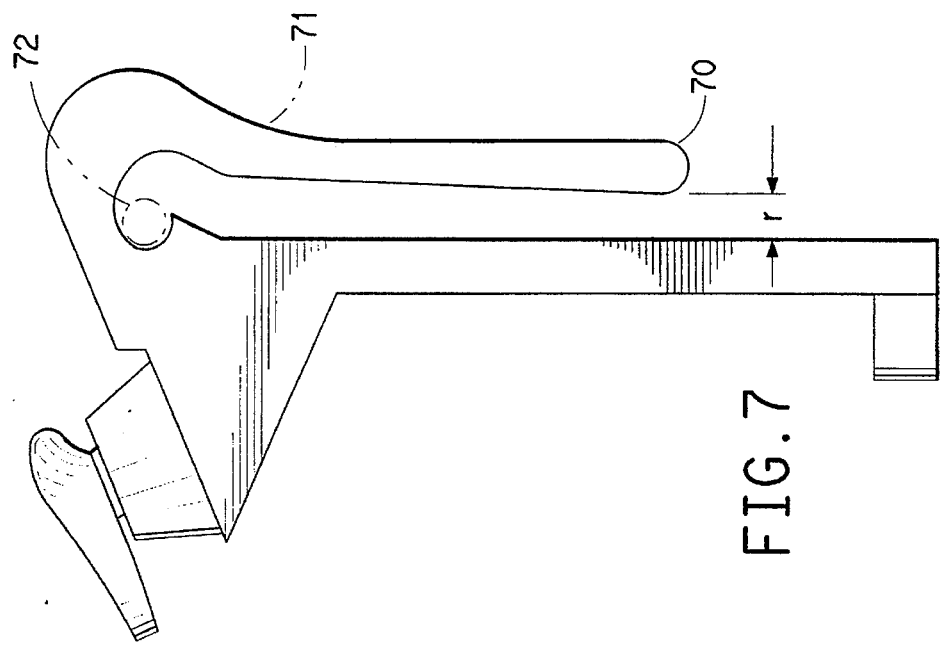
FIG. 7 is a side elevation view of another embodiment of the novel fender hanger.

It is also envisioned that the channel can be restricted by curving the back plate, the inboard face of the body, or both into the channel. In a preferred embodiment, shown in FIG. 7, the back plate 71 has a smoothly curved base 70 extending toward the body to create a channel restriction, r. In order to enter the channel a suspension cable 72 of larger cross section dimension than the restriction, forces the back plate to deflect away from the body. After the cable has moved past the restriction, the back plate reverts to its initial position relative to the body. The body, bridge and back plate should be of materials capable of only small elastic deformation to allow the back plate to deflect and recover as just described.

The novel hanger is especially useful in connection with guard rails and lifelines found on recreational watercraft. Guard rails are customarily rigid metal cylindrical tubes of about 0.5–1.5 inch outside diameter. A lifeline is normally a solid rod, or wire or fiber cable, sometimes covered with a smooth plastic sheath. The outside diameter of a lifeline is typically about 0.125–0.5 inch. The depth of the channel, d, FIG. 2, i.e., the distance between the inboard face of the body and the back plate should be selected to properly fit the guard rail or lifeline on which the hanger is mounted. That is, the depth should be slightly larger than the cross section dimension of the suspension cable. Lifelines are typically anchored at two ends and strung through rigid vertical supporting stanchions of rail-like construction several feet apart. Due to the stanchions, a hanger often cannot simply slide from one end of the lifeline to the other. However, the novel hanger can be easily removed from the lifeline and remounted at a location beyond an intervening stanchion. As previously explained, relocation of the novel hanger can be accomplished using only one hand.

Referring to FIGS. 1 and 2, the hanger of this invention additionally includes on the outboard face a bail 3 near the foot and a fairlead 5 near the head. Protrusion 11 on the outboard face defines an outboard extending ledge 9. The ledge has a generally flat surface defining a plane which intersects a plane coincident with the outboard face in an acute angle, a. The hanger further includes a line attachment means 4 for securing the fender suspension line to the hanger. Many types of fastening hardware, such as horned cleats, jam cleats and cam cleats, can serve for the line attachment means. The fastening hardware can be mounted on the ledge, the bridge or on the back plate. Preferably the line attachment means is a spring-loaded, cam cleat, and more preferably a spring-loaded, dual cam cleat 4. The dual cam cleat is preferably seated on the ledge with the fairlead above and outboard of the cam cleat. This orientation allows the fender suspension line to move freely in the vertical direction. The fairlead restricts horizontal motion of the line and helps direct the line between the cams. In such configuration, the fairlead supports 17 can be affixed to the cam axle posts 18. The suspension line can be lead between the cams by a circular eye or similar line movement constraining device, provided that the eye does not interfere with free vertical movement of the line.

In operation, the hanger is mounted on a cable at a location where a fender is to be deployed. As mentioned, this ordinarily can be done using only one hand. A boat fender, not shown, is tied to a suspension line 7 and is placed alongside the hull. The free end of the suspension line 7 is threaded upward through the bail, along the outboard face and between the fairlead and the ledge. Although the bail shown is a variation of an eye strap configuration, i.e., it confines the suspension line between the outboard face and a ribbon part extending from the outboard face, other bail types should be suitable. For example, the bail could be an arm extending from the outboard face of the elongated body at the foot, with a hole bored through the arm. Optionally a stop knot, not shown, can be tied in the free end above the fairlead to prevent losing the fender overboard if the deckhand accidentally lets the line fall down through the fairlead and bail. Line 7 is held aloft in a generally vertical orientation 13 while the deckhand raises or lowers the fender to a desired elevation. The fender move freely either up or down and only one hand tending the free end of the line is needed to adjust fender height. When the desired fender level is reached, line 7 is brought downward to orientation 15 and into the cam cleat, thereby fastening the line and maintaining fender position. If further fender elevation adjustment becomes necessary, the line can be freed from the cam cleat, the level changed, and the line reset in the cam cleat. All these operations can be accomplished using only one hand.

Ideally, fender elevation adjustment should be made while maintaining the suspension line exactly vertical. However, a deckhand operating the fender hanger might naturally pull the fender suspension line inboard at an angle to the vertical, b, FIG. 6. This applies a horizontal element of force in the direction shown by arrow Fh, to the head of the hanger. One might expect this force to cause the fender hanger to rotate about the suspension cable in the direction t, and slip off. However, when the fender suspension line is pulled inboard, hip 89 presses against the cable 86 to stop the cable from sliding out of the channel. Due to the acute angle a, and the spatial relationships between the bail, the fairlead and the ledge, the novel fender hanger surprisingly resists the tendency to slip off the cable for substantially large values of angle b. Thus the novel fender hanger allows the deckhand great latitude in direction of pull on the suspension line without concern that the hanger will disengage from the suspension cable.

The hanger shown in FIGS. 1 and 2 includes optional chocks mounted on each side of the bridge. The flanges 19 of the chocks are separated by a space which provides a pathway for leading the free end of the fender suspension line neatly inboard alongside the back plate. This feature places the free end in a convenient location for the deckhand to reach should the necessity to quickly adjust fender elevation arise.

The bridge normally extends across the full width of the hanger. However, primarily for use with polished metal guard rails of at least about 1 inch outer diameter, the central part of the bridge can be cut out to leave only chocks separated by a central gap. The gap exposes the top surface of the guard rail between the chocks, as best seen in FIG. 1, so that the suspension line lies directly on the exposed surface. This should reduce friction between the line and the hanger, especially when heavy fenders are deployed, and thus can make hauling in or paying out the suspension line easier.

FIGS. 4 and 5 illustrate another embodiment 40 of a boat fender hanger according to the present invention. The protrusion 41 from the outboard face 42 includes an angular extension 43. A dual cam cleat 44, shown only in FIG. 4, is mounted on an inboard facet 49 of angular extension 43. The protrusion also has a hole 45 extending upward to the ledge 48 with an axis substantially parallel to the axis of elongation of the hanger. In operation, the fender suspension line 47 extends upward through the bail, 46, along the outboard face, through the hole and into the cam cleat. The free end of the fender suspension line trails outboard of the hanger, advantageously reducing the risk of accidental entanglement of the free end with other objects and lines onboard. Alternatively, the cam cleat can be mounted on ledge 48 in a fore-to-aft orientation which leads the free end of the suspension line along the side of the hanger.

The novel boat fender hanger can be made of conventional, plastics and noncorrosive metals used in the marine industry, such as aluminum, brass, stainless steel, and natural or reinforced engineering polymers. If a low density material is used, the foot of the body can be weighted with an effective amount of an embedded, concealed high density material, such as lead. This can promote the tendency of the hanger to hang in a near vertical orientation and further reduce the risk that a hanger will fall from the suspension cable.

A wooden model of the boat fender hanger having a straight path channel and no mechanical locking means was found to easily hang from the lifeline of a recreational sailboat. An inflatable rubber boat fender was hung from the hanger and the position of the fender was easily adjusted using only one hand. The model fender hanger was about 4 inches wide and measured about 7 inches from foot to head. The channel depth was about one half inch. The angle between the ledge and outboard face of the body was about 25 degrees. The bail was an approximately half inch diameter bullseye fairlead, such as that available from the Harken marine hardware company. The fairlead was a stock fairlead, such as the Ronstan model RF5005, which was modified to allow the fairlead to mount on the posts of a small dual cam dear, of the type available from Ronstan or Schaefer marine hardware companies.

Although specific forms of the invention have been selected for illustration in the drawings, and the preceding description is drawn in specific terms for the purpose of describing these forms of the invention, this description is not intended to limit the scope of the invention which is defined in the claims. The novel hanger can be used for positioning objects, offer than boat fenders, hung by a line and suspended from a substantially horizontal rod-like structure.

I claim

1. An adjustable hanger to be hung from a suspension cable having a cross section dimension, the hanger comprising:

an elongated body having an outboard face, an inboard face, a head and a foot;

a bail on the outboard face of the foot, the bail defining an opening for passage of a line from an object to be suspended from the hanger;

a ledge extending from the outboard face of the head at an acute angle with a plane coincident with the outboard face;

a fairlead on the head to allow free vertical movement and restricted horizontal movement of the line;

a back plate extending along a portion of the inboard face and spaced apart therefrom to define a channel having an open end proximate to the foot and adapted to receive the suspension cable;

a bridge joining the elongated body and back plate, the bridge defining a closed end to the channel in a serpentine cross section adapted to pivotally support the hanger on the suspension cable; and a line attachment means on the hanger for releasably fastening the line to the hanger.

2. The adjustable hanger of claim 1 wherein the line attachment means comprises a spring loaded cam cleat.

3. The adjustable hanger of claim 2 wherein the line attachment means is a dual cam cleat affixed to the ledge, each cam having an axial post, and wherein the fairlead is affixed to the axial posts.

4. The adjustable hanger of claim 1 wherein the line attachment means is a jam cleat.

5. The adjustable hanger of claim 1 further comprising an arm extending inboard from the inboard face of the foot to extend the channel in a winding path.

6. The adjustable hanger of claim 5 wherein the channel extends in an L-shaped winding path.

7. The adjustable hanger of claim 5 wherein the channel extends in a T-shaped winding path.

8. The adjustable hanger of claim 5 wherein the back plate extends to form a skewed channel winding path.

9. The adjustable hanger of claim 1 further comprising a mechanical locking means on at least one of the elongated body and back plate, for positively blocking the channel, thereby preventing the hanger from falling off the cable.

10. The adjustable hanger of claim 9 wherein the mechanical locking means is capable of operation by only one hand.

11. The adjustable hanger of claim 10 wherein the mechanical locking means is a spring-loaded, sliding lock on the back plate.

12. The adjustable hanger of claim 10 wherein at least one of the back plate and elongated body smoothly curve into the channel to create a restriction smaller than the cross section dimension of the cable, and wherein the back plate, bridge and elongated are of materials capable of only slight elastic deformation.

13. The adjustable hanger of claim 1 wherein each side of the bridge further comprises a chock for leading the line inboard from the fairlead adjacent the back plate.

14. An adjustable hanger to be hung from a suspension cable having a cross section dimension, the hanger comprising:

an elongated body having an outboard face, an inboard face, a head, a foot and an axis of elongation;

a bail on the outboard face of the foot, the bail defining an opening for passage of a line from an object to be suspended from the hanger;

a protrusion extending from the outboard face of the head, the protrusion having a hole of diameter sufficiently large to accommodate the line, and the hole having an axis substantially parallel to the axis of elongation, the hole extending upward to a ledge at an acute angle with a plane coincident with the outboard face, the protrusion further including an angular extension outboard of the ledge, the angular extension defining an inboard facet;

a back plate extending along a portion of the inboard face and spaced apart therefrom to define a channel having an open end proximate to the foot and adapted to receive the suspension cable;

a bridge joining the elongated body and back plate, the bridge defining a closed end to the channel in a serpentine cross section adapted to pivotally support the hanger on the suspension cable; and a spring-loaded cam cleat mounted on the inboard facet to releasably fasten the line which is threaded upward through the bail, alongside the outboard face and through the hole.

15. The method of adjustably positioning an object to be suspended from one end of a line, comprising the steps of:

(a) hanging an adjustable hanger at a preselected position along a substantially horizontal suspension cable, the adjustable hanger comprising:

an elongated body having an outboard face, an inboard face, a head and a foot;

a bail on the outboard face of the foot, the bail defining an opening for passage of a line from the object to be suspended;

a ledge extending from the outboard face of the head at an acute angle with a plane coincident with the outboard face;

a fairlead on the head to allow free vertical movement and restricted horizontal movement of the line;

a back plate extending along a portion of the inboard face and spaced apart therefrom to define a channel having an open end proximate to the foot and adapted to receive the suspension cable;

a bridge joining the elongated body and back plate, the bridge defining a dosed end to the channel in a serpentine cross section adapted to pivotally support the hanger on the suspension cable; and a line attachment means on the hanger for releasably fastening the line to the hanger; by inserting the suspension cable into the channel and advancing the cable in the channel until the cable seats against the closed end;

(b) threading the free end of the line from below the hanger through the bail, along the outboard face, and between the fairlead and ledge;

(c) while holding the free end substantially vertically above the boat fender, hauling in or paying out the line until the object is raised or lowered to a predetermined vertical position; and (d) fastening the free end to the line attachment means, thereby holding the object in fixed vertical position relative to the suspension cable.

16. The method of claim 15 wherein the object suspended from the line is a boat fender.

17. The method of claim 16 wherein the line attachment means comprises a spring loaded dual cam cleat affixed to the ledge.

18. The method of claim 16 wherein the line attachment means is a jam cleat.

19. The method of claim 16 wherein the adjustable hanger further comprises an arm extending inboard from the inboard face of the foot to extend the channel in a winding path.

20. The method of claim 16 wherein each side of the bridge further comprises a chock for leading the line trailing inboard from the fairlead adjacent the back plate.

* * * * *